United States Patent
Pauritsch et al.

(10) Patent No.: US 9,372,122 B2
(45) Date of Patent: Jun. 21, 2016

(54) ELECTRONIC CIRCUIT TO MONITOR A TEMPERATURE OF A LIGHT EMITTING DIODE

(71) Applicant: ams AG, Unterpremstätten (AT)

(72) Inventors: Manfred Pauritsch, Graz (AT); Werner Schögler, Graz (AT)

(73) Assignee: AMS AG, Unterpremstaetten (AT)

( * ) Notice: Subject to any disclaimer, the term of this patent is extended or adjusted under 35 U.S.C. 154(b) by 432 days.

(21) Appl. No.: 13/921,068

(22) Filed: Jun. 18, 2013

(65) Prior Publication Data

US 2013/0336360 A1   Dec. 19, 2013

(30) Foreign Application Priority Data

Jun. 19, 2012   (EP) .................................. 12172624

(51) Int. Cl.
*G01K 7/02* (2006.01)
*H05B 33/08* (2006.01)

(52) U.S. Cl.
CPC ................ *G01K 7/02* (2013.01); *H05B 33/089* (2013.01); *H05B 33/0848* (2013.01)

(58) Field of Classification Search
CPC ....... G01K 7/02; G01K 7/021; H05B 33/089; H05B 33/0833; H05B 33/0875; H05B 33/0845; H05B 33/0848; H05B 33/0881; H05B 33/0884; H05B 33/0893
USPC .......................................... 374/163, E17.002
See application file for complete search history.

(56) References Cited

U.S. PATENT DOCUMENTS

| | | | |
|---|---|---|---|
| 2003/0133491 A1* | 7/2003 | Shih ......................... | G01K 7/01 374/163 |
| 2008/0084169 A1 | 4/2008 | Wendt et al. | |
| 2010/0231136 A1* | 9/2010 | Reisenauer ........ | H05B 33/0848 315/276 |
| 2010/0315019 A1 | 12/2010 | Hoogzaad et al. | |
| 2011/0031903 A1* | 2/2011 | Nguyen Hoang ........ | G01K 7/01 374/E7.035 |
| 2011/0243167 A1* | 10/2011 | Castillo .............. | H05B 33/0854 315/309 |
| 2012/0119710 A1 | 5/2012 | Trattler et al. | |
| 2012/0139544 A1 | 6/2012 | Zimmermann et al. | |
| 2012/0299481 A1* | 11/2012 | Stevens ................ | H05B 33/089 315/117 |

FOREIGN PATENT DOCUMENTS

DE   10 2007 029 123 A1   1/2009
DE       102009018098 A1   10/2010

* cited by examiner

*Primary Examiner* — Lisa Caputo
*Assistant Examiner* — Philip Cotey
(74) *Attorney, Agent, or Firm* — McDermott Will & Emery LLP

(57) ABSTRACT

An electronic circuit (10) to monitor a temperature of a light emitting diode (1) comprises a current generating circuit (110) to generate a current flow of at least a first and second current (IC1, IC2) through the light emitting diode (1) and a voltage monitoring circuit (120) to monitor a voltage of the light emitting diode (1). The voltage monitoring circuit (120) is further arranged to determine a difference of a respective value of a first and second voltage (Vf1, Vf2) of the light emitting diode (1) to monitor the temperature of the light emitting diode (1), wherein the first voltage (Vf1) and second voltage (Vf2) of the light emitting diode (1) is determined while driving the first and second current (IC2) through the light emitting diode (1).

13 Claims, 3 Drawing Sheets

ELECTRONIC CIRCUIT TO MONITOR A TEMPERATURE OF A LIGHT EMITTING DIODE

TECHNICAL FIELD

The present invention relates to an electronic circuit to monitor a temperature of a light emitting diode and a method to monitor a temperature of a light emitting diode.

BACKGROUND

Light emitting diodes (LEDs) are used in a plurality of application fields. White LEDs are, for example, used in general lighting applications and for TV or monitor backlighting applications. For all these applications, light emitting diodes are the main part of the overall bill of material. The intensity of the light emission of an LED is dependent on the level of current driven through the LED. The larger the operating LED current, the larger is the light intensity emitted by the LED. Therefore, high LED current values are desirable to maximize light output with a restricted number of LEDs.

The main limitation of increasing the current driven through an LED is the temperature rise inside of the LED because of power dissipation. Too high temperatures can cause degradation of the LED with reduced lifetime and early life failures. Therefore, monitoring the temperature of an LED during its operation is an important matter.

It is desirable to provide an electronic circuit to monitor a temperature of a light emitting diode to ensure a reliable operation of the light emitting diode. A further concern is to provide a method to monitor a temperature of a light emitting diode to ensure a reliable operation of the light emitting diode.

SUMMARY

An embodiment of an electronic circuit to monitor a temperature of a light emitting diode is specified in claim 1. An embodiment of a method to monitor a temperature of a light emitting diode is defined in claim 13.

According to a possible embodiment of an electronic circuit to monitor a temperature of a light emitting diode the electronic circuit may comprise a current generating circuit to generate a current flow of at least a first and a second current through the light emitting diode, wherein the at least first and second current are different from each other. The electronic circuit may further comprise a voltage monitoring circuit to monitor a voltage of the light emitting diode. The voltage monitoring circuit is arranged to determine a first voltage of the light emitting diode while driving the first current through the light emitting diode and to determine a second voltage of the light emitting diode while driving the second current through the light emitting diode. The voltage monitoring circuit is arranged to determine a difference of the first and a second voltage of the light emitting diode to monitor the temperature of the light emitting diode.

The electronic circuit is arranged to monitor the temperature of a light emitting diode by measuring a junction temperature of a pn-junction of the light emitting diode. The electronic circuit may be formed as a build-in self test (BIST) circuit which may be part of an LED driver circuit.

The electronic circuit may comprise a controller circuit to control the function of the current generating circuit and the function of the voltage monitoring circuit. The controller circuit may operate the current generating circuit in a test mode or a normal mode. In the test mode the current generating circuit generates the first and the second current. The controller circuit may be arranged to control the current generating circuit such that the current generating circuit generates the first current in a first time interval of the test mode and the second current in a subsequent second time interval of the test mode.

The current generating circuit may be arranged to be operated in a normal mode in which the current generating circuit generates the operating current being driven through the light emitting diode to operate the light emitting diode to emit light.

According to a possible embodiment of the electronic circuit the controller circuit controls the function of the current generating circuit such that the current generating circuit generates the second current subsequent to the first current in the test mode of the current generating circuit without operating the current generating circuit in the normal mode between the first and second time interval.

According to another embodiment of the electronic circuit the controller circuit controls the function of the current generating circuit such that the current generating circuit generates the second current subsequent to the first current in the test mode of the current generating circuit, wherein the current generating circuit is operated in the normal mode between the first and second time interval of the test mode.

The controller circuit may be formed as a built-in self test controller that executes the test mode, i.e. a test sequence to monitor the temperature of the light emitting diode, in regular time ticks. Timings for operating the current generating circuit in the normal and test mode can be freely chosen in a wide range. As an example, BIST cycles may be repeated every second, wherein the BIST cycle comprises the first time interval to generate the first current and the second time interval to generate the second current. The first and the second current may be generated in the BIST cycle in each case for 50 microseconds. The duration of the BIST cycles in the test mode which interrupt the normal mode have to be chosen such that the human eye does not notice any disturbance of the operation of the light emitting diode in the normal mode to emit a continuous light.

The BIST timing cycle can be implemented in different ways, either by generating an immediate sequence of two current values or by using alternating current values within each cycle. The BIST can be easily combined with PWM (pulse width modulation) schemes used for LED brightness control, for example having a BIST cycle within each n-th PWM cycle.

A method to monitor a temperature of a light emitting diode may comprise the following steps:
- generating a first current and driving the first current through the light emitting diode,
- determining a first voltage of the light emitting diode, when driving the first current through the light emitting diode,
- generating a second current being different from the first current and driving the second current through the light emitting diode,
- determining a second voltage of the light emitting diode, when driving the second current through the light emitting diode, and
- monitoring the temperature of the light emitting diode by determining a difference of the first and second voltage of the light emitting diode.

According to a possible embodiment, two small levels for the first and second current are used in the BIST approach to enable high precision temperature detection for LEDs which usually have a significant series resistance. The levels of the first and second currents may be smaller than the level of the operating current used in the normal mode to operate the LEDs to emit light.

It is to be understood that both the foregoing general description and the following detailed description present embodiments and are intended to provide an overview or a framework for understanding the nature and character of the disclosure. The accompanying drawings are included to provide a further understanding, and are incorporated into and constitute a part of this specification. The drawings illustrate various embodiments and, together with the description, serve to explain the principles and operation of the concepts disclosed.

BRIEF DESCRIPTION OF THE DRAWINGS

FIG. 1 shows an embodiment of an electronic circuit 100 to monitor a temperature of a light emitting diode. The electronic circuit may be included in an LED driver circuit 10. The electronic circuit 100 comprises a current generating circuit 110 to generate a current flow of a first current IC1, a second current IC2 and a third current IOP. The current generating circuit is arranged to be operated in a test mode in which the current generating selectively generates the first and second current, or in a normal mode in which the current generating circuit generates the third current. The current generating circuit generates the third current as an operating current with a level higher than the first and second current. The operating current is generated with a level to operate the light emitting diode to emit light. The first and second currents are sensing/measurement currents which are provided in the test mode.

Figure 1:
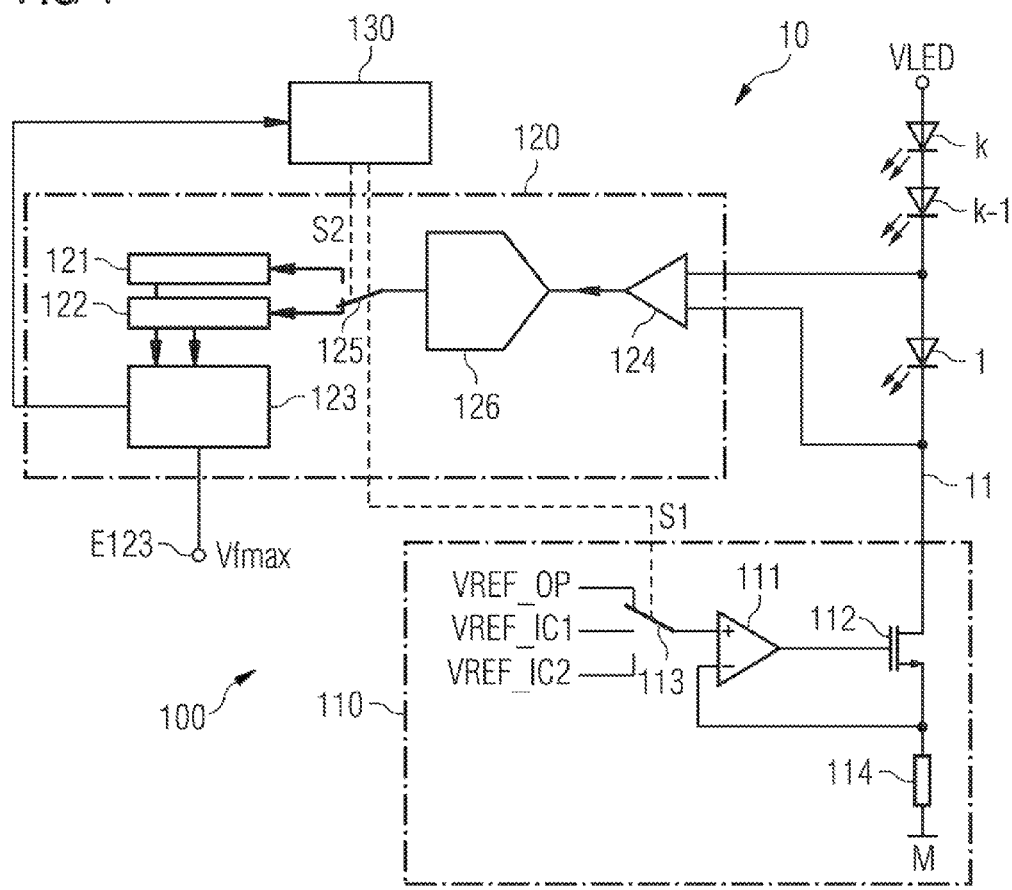
FIG. 1 shows an embodiment of an electronic circuit to monitor a temperature of a light emitting diode.

The current generating circuit may comprise an operational amplifier 111 and a transistor 112 having a control terminal coupled to an output side of the operational amplifier 111. A first one of the input terminals of the operational amplifier 111, for example the non-inverting input terminal of operational amplifier, may be connected via a controllable switch 113 to a first reference potential VREF_IC1, a second reference potential VREF_IC2 and a third reference potential VREF_OP.

A current path 11 comprises light emitting diodes 1, ..., k−1, k which are connected in series between a voltage supply terminal VLED to apply a supply voltage and a reference potential M. The transistor 112 is disposed in the current path between one of the light emitting diodes 1 and a resistor 114 which is connected to the reference potential M. A second of the input terminals of the operational amplifier 111, for example the inverting input terminal of the operational amplifier, is connected to the current path 11 between the transistor 112 and the resistor 114.

In the embodiment of the electronic circuit shown in FIG. 1, the temperature of the light emitting diode 1 is monitored. For this purpose the electronic circuit comprises a voltage monitoring circuit 120 to monitor a voltage of the light emitting diode 1. In particular, the voltage monitoring circuit 120 is arranged to determine a forward voltage Vf1, Vf2 of the light emitting diode 1. The voltage monitoring circuit 120 is arranged to determine a first (forward) voltage Vf1 of the light emitting diode while driving the first current IC1 through the light emitting diode 1 and to determine the second (forward) voltage Vf2 of the light emitting diode 1 while driving the second current IC2 through the light emitting diode 1.

The voltage monitoring circuit 120 may comprise a first storage device 121 to store a measured value of the first voltage Vf1 and a second storage device 122 to store a measured value of the second voltage Vf2. The first and second storage devices 121, 122 are coupled to a calculating circuit 123 of the voltage monitoring circuit 120. The calculating circuit 123 is arranged to calculate a difference between the first and the second voltage Vf1, Vf2 by subtracting the stored value of the first voltage Vf1 from the stored value of the second voltage Vf2. The calculating circuit 123 comprises an input terminal E123 to apply a threshold value Vfmax. The calculating circuit is further arranged to compare the calculated difference between the values of the first and second voltage Vf1, Vf2 with the threshold value Vfmax.

In order to determine the (forward) voltage of the light emitting diode 1 the voltage monitoring circuit 120 comprises a voltage metering circuit 124 which may be formed as an operational amplifier. The input terminals of the operational amplifier 124 may be connected between an input and output side of the light emitting diode 1. The value of the voltage of the light emitting diode measured by the voltage metering circuit is provided at an output side of the voltage metering circuit 124.

The voltage monitoring circuit 120 may further comprise a controllable switch 125 which is coupled to an output side of the voltage metering circuit 124 to selectively couple the output side of the voltage metering circuit 124 to the first and second storage devices 121, 122. In a first state of the controllable switch 125 the output side of the voltage metering circuit 124 is coupled to the first storage device 121 to store the value of the first voltage Vf1. In a second state of the controllable switch 125, the output side of the voltage metering circuit 124 is coupled to the second storage device 122 to store the value second voltage Vf2.

According to an embodiment the storage devices may be formed to store digitized data. In this embodiment an analog/digital converter circuit 126 is disposed between the output side of the voltage metering circuit 124 and the controllable switch 125. The analog/digital converter 126 is arranged to transform an analog output signal of the operational amplifier 124 to a digitized data value which may be stored in storage devices 121 and 122.

The electronic circuit may comprise a controller circuit 130 which may be formed as a built-in self test (BIST) controller to control the operation of the electronic circuit 100 to monitor the temperature of the light emitting diode 1. The controller circuit 130 may be arranged to control the function of the current generating circuit 110, in particular the state of the controllable switch 113, and the function of the voltage monitoring circuit 120, in particular the state of the controllable switch 125. For this purpose the controller circuit 130 may generate a control signal S1 to control the switching state of the controllable switch 113 and a control signal S2 to control the switching state of the controllable switch 125.

The function of the electronic circuit and a method to monitor the temperature of the light emitting diode 1 is described in the following with reference to FIGS. 1 and 2. The string of the light emitting diodes 1, ... k−1, k which are connected in series in the current path 11 may be operated in the normal mode. In order to operate the light emitting diodes in the normal mode the controller circuit 130 generates the control signal S1 with a state effecting that the controllable switch 113 connects the input side of the operational amplifier 111 to the reference potential VREF_OP. In this case the current generating circuit 110 generates the operating current IOP in the current path 11 driving through the light emitting diodes 1, ..., k−1, k.

In order to operate the light emitting diode 1 in the test mode, the controller circuit 130 generates the control signal S1 with a state effecting that the controllable switch 113 connects the input side of the operational amplifier 111 to the reference potential VREF_IC1 or VREF_IC2.

Figure 2:
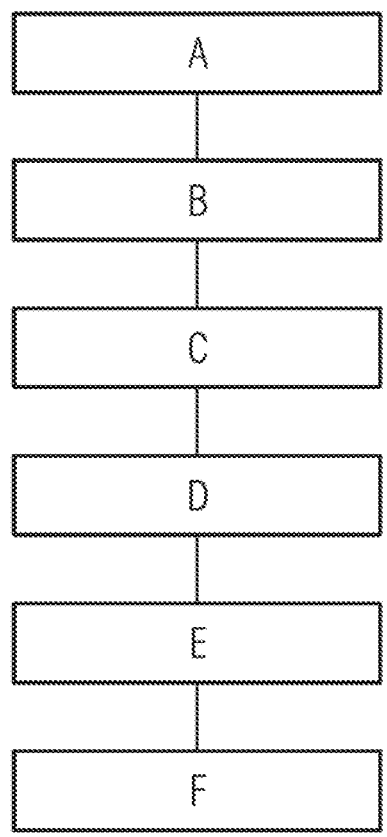
FIG. 2 shows an embodiment of a method to monitor a temperature of a light emitting diode.

In a step A of the test mode shown in FIG. 2 the current generating circuit 110 generates the first current IC1 and drives the first current IC1 through the light emitting diode 1. For this purpose the controller circuit 130 generates the state of the control signal S1 so that the controllable switch 113 connects the input side of the operational amplifier 111 to the reference potential VREF_IC1. As a consequence, the current generating circuit 110 generates the current IC1 in the current path 11.

In a subsequent step B of the test mode the first voltage Vf1 of the light emitting diode 1 is determined by the voltage metering circuit 120. In order to store the measured value of the first voltage Vf1 of the light emitting diode 1 the controller circuit 130 generates the control signal S2 with a state so that the first storage device 121 is coupled by the controllable switch 125 to the output side of the voltage metering circuit 124. The determined analog value of the first voltage Vf1 which is output at the output side of the voltage metering circuit 124 is converted into a digitized value by the analog/digital converter 126 and the digitized value indicating the level of the first voltage Vf1 stored in the storage device 121. The value of the first voltage Vf1 is a measure for the junction temperature of the light emitting diode 1.

In a subsequent step C of the test mode, the current generating circuit 110 generates the second current IC2 being different from the first current IC1 and drives the second current IC2 through the light emitting diode 1. For this purpose the controller circuit 130 generates a state of the control signal S1 effecting that the controllable switch 113 connects the input side of operational amplifier 111 to the reference potential VREF_IC2. As a consequence, the second current IC2 is driven through the light emitting diode 1.

In a subsequent step D the value of the second voltage Vf2 of the light emitting diode 1 is determined by the voltage metering circuit 124 of the voltage monitoring circuit 120. The value of the second voltage Vf2 is stored in the storage device 122. For this purpose the controller circuit 130 controls the controllable switch 125 so that the output side of the voltage metering circuit 124 is coupled to the storage device 122. The voltage metering circuit 124 outputs an analog value of the measured value of the second voltage Vf2 at its output side. The analog value is converted in a digitized format by the analog/digital converter 126 and the digitized data indicating the level of the second voltage Vf2 is stored in the storage device 122. The value of the second voltage Vf2 is a measure for the junction temperature of the light emitting diode 1.

In a subsequent step E the temperature of the light emitting diode 1 is monitored by determining a difference ΔVf of the values of the first voltage Vf1 and the second voltage Vf2 by the calculating circuit 123. The difference ΔVf of the first and second voltage may be expressed by the equation $$\Delta Vf = \frac{K \cdot T}{q} \ln\left(\frac{IC1}{IC2}\right) + (IC1 - IC2) \cdot R, \quad (1)$$

in which parameter K specifies the Boltzmann's constant $(1.3806488 \cdot 10^{-23}$ J/K), parameter T specifies the temperature in Kelvins, parameter q specifies the charge of an electron $(1.602176565 \cdot 10^{-19}$ C) and parameter R specifies the series resistance of the light emitting diode. If the second term (IC1−IC2)·R in equation (1) may be disregarded, the above-specified equation simplifies to $$\Delta Vf = \frac{K \cdot T}{q} \ln\left(\frac{IC1}{IC2}\right) \quad (2)$$

Assuming that the term $$\frac{K}{q} \ln\left(\frac{IC1}{IC2}\right)$$

in equation (2) is constant, the voltage difference ΔVf is proportional to the temperature T of the light emitting diode.

In order that the term (IC1−IC2)·R may be disregarded, the second current IC2 may be in the range of the first current IC1, i.e. IC2≈IC1. In order to get a high constant coefficient $$\frac{K}{q} \ln\left(\frac{IC1}{IC2}\right),$$

the ration between IC2 and IC1 has to be large. In order to prevent an additional heating of the light emitting diode by the first and second currents IC1 and IC2, the first and second currents have to be small in comparison to the operating current IOP to operate the light emitting diode in normal mode. The measurement currents IC1 and IC2 may be generated with levels of 1% to 0.1% of the level of the operating current or even less than 0.1% of the operating current. If the operating current IOP driven through the light emitting diode 1 during normal mode has a value of about 100 mA, the sensing currents IC1 and IC2 may be generated by the current generating circuit 110 in a range of about 10 μA.

According to a subsequent step F, the calculating circuit 123 compares the calculated difference ΔVf with a threshold value Vfmax. If the calculating circuit 123 detects that the difference between the second and first voltage exceeds the threshold level Vfmax, an LED over temperature condition is detected. The controller circuit 130 is arranged to reduce the operating LED current IOP in the normal mode or to shut down the LED string of the LEDs 1, ..., k−1, k so that the operation of the light emitting diodes to emit light is interrupted for a certain time which is sufficient for cooling the light emitting diodes.

Figure 3:
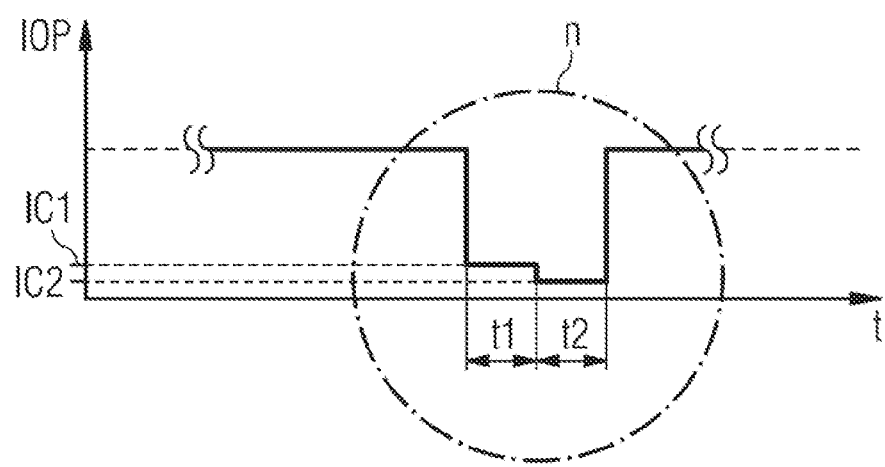
FIG. 3 shows an embodiment of a test mode to monitor a temperature of a light emitting diode.
Figure 4:
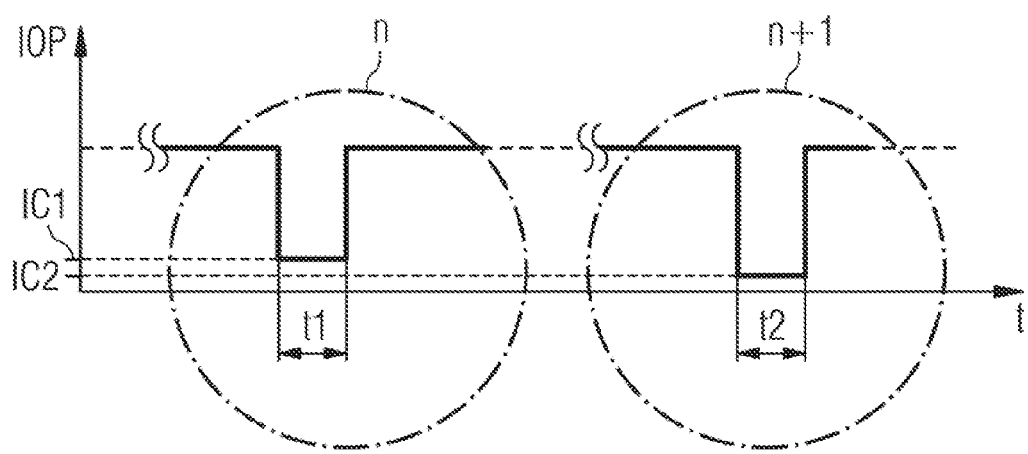
FIG. 4 shows another embodiment of a test mode to monitor a temperature of a light emitting diode.

FIG. 3 and FIG. 4 show an embodiment of a test mode to monitor a temperature of the light emitting diode 1. According to both embodiments the test mode comprises a first time interval t1 and a second time interval t2. The current generating circuit 110 is arranged to be operated in the test mode, wherein the current generating circuit 10 generates the first current IC1 in the first time interval t1 and the second current IC2 in the second time interval t2.

As shown in the embodiment of FIG. 3, the test mode just contains a single test cycle n. The controller circuit 130 controls the function of the current generating circuit 110 such that in the test cycle of the test mode the current generating circuit 110 generates the second current IC2 in the second time interval t2 immediately subsequent to the first time interval t1. The current generating circuit generates the sequence of the first and second currents IC1, IC2 without operating the current generating circuit in the normal mode between the first and second time interval t1 and t2. That means that the first and second time intervals of the test mode directly follow each other.

According to another embodiment of the test mode shown in FIG. 4 the test mode comprises the test cycles n and n+1. The controller circuit 130 controls the function of the current generating circuit 110 such that the current generating circuit 110 generates the first measurement current IC1 in the first test cycle n in of the test mode in a time interval t1 and generates the second measurement current IC2 in the second test cycle n+1 of the test mode in a time interval t2. The current generating circuit generates the second current IC2 in test cycle n+1/in the time interval t2 subsequent to the first current IC1 in the test cycle n/in the time interval t1, wherein the current generating circuit 110 is operated in the normal mode between the first and second time intervals t1 and t2. That means that the current generating circuit generates the operating current IOP to operate the light emitting diode in the normal mode between the first test cycle n of the test mode in which the current generating circuit generate the first measurement current IC1 and the subsequent test cycle n+1 of the test mode in which the current generating circuit generates the second measurement current IC2.

Figure 5:
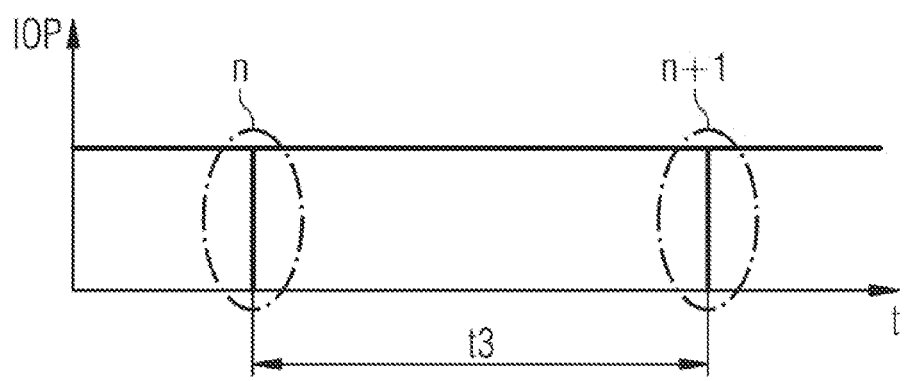
FIG. 5 shows an interruption of a normal mode to operate the light emitting diode for emitting light by cycles of a test mode to monitor a temperature of the light emitting diode.

The monitoring of the temperature of the light emitting diode 1 can be repeated continuously during operation of the light emitting diodes 1, . . . , k−1, k in the normal mode. As shown in FIG. 5 the controller circuit 130 may execute a test sequence in regular time ticks of, for example, one second. That means that the normal mode in which the operating current IOP is driven through the series connection of the light emitting diodes 1, . . . , k−1, k is interrupted by BIST cycles n, n+1, . . . .

During the BIST cycles n, n+1, . . . the current generating circuit 110 generates the first and second sensing currents IC1, IC2 either directly behind each other as shown in FIG. 3 or the current generating circuit 110 generates the first sensing current IC1 in BIST cycle n and generates the second sensing current IC2 in BIST cycle n+1 as shown in FIG. 4, wherein the current generating circuit generates the operating current IOP of the normal mode between the BIST cycles n and n+1. The built-in self test to monitor the temperature of the light emitting diode can be easily combined with typical PWM (pulse width modulation) schemes used for LED brightness control, for example having a BIST within each n-th PWM cycle.

Although specific terms are employed in the description, they are used in a generic and descriptive sense only and not for purposes of limitation. Many modifications and other embodiments set forth herein will come to mind to one skilled in the art to which the embodiments pertain having the benefit of the teachings presented in the foregoing descriptions and the associated drawings. Therefore, it is to be understood that the description and the claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents.

The invention claimed is:

1. An electronic circuit to monitor a temperature of a light emitting diode, comprising:
   a current generating circuit to generate a current flow of at least a first and second current through the light emitting diode, the at least first and second current being different from each other and respectively having a level which is lower than an operating current to operate the light emitting diode to emit light; and
   a voltage monitoring circuit to monitor a voltage of the light emitting diode,
   wherein the voltage monitoring circuit comprises a voltage metering circuit to determine a first voltage of the light emitting diode while driving the first current through the light emitting diode and to determine a second voltage of the light emitting diode while driving the second current through the light emitting diode, and
   wherein the voltage monitoring circuit comprises a calculating circuit to determine a difference of the first and a second voltage of the light emitting diode to monitor the temperature of the light emitting diode.

2. The electronic circuit as claimed in claim 1, further comprising:
   a controller circuit to control the function of the current generating circuit and the function of the voltage monitoring circuit.

3. The electronic circuit as claimed in claim 1, wherein the current generating circuit is arranged to be operated in a test mode, in which the current generating circuit generates the first current and the second current, and
   wherein the controller circuit is arranged to control the current generating circuit such that the current generating circuit generates the first current in a first time interval of the test mode and the second current in a subsequent second time interval of the test mode.

4. The electronic circuit as claimed in claim 1, wherein the current generating circuit is arranged to be operated in a normal mode in which the current generating circuit generates the operating current being driven through the light emitting diode to operate the light emitting diode to emit light.

5. The electronic circuit as claimed in claim 4, wherein the controller circuit controls the function of the current generating circuit such that the current generating circuit generates the second current subsequent to the first current in the test mode of the current generating circuit without operating the current generating circuit in the normal mode between the first and second time interval.

6. The electronic circuit as claimed in claim 5, wherein the controller circuit controls the function of the current generating circuit such that the normal mode of the current generating circuit is continuously interrupted to operate the current generating circuit in the test mode.

7. The electronic circuit as claimed in claim 4, wherein the controller circuit controls the function of the current generating circuit such that the current generating circuit generates the second current subsequent to the first current in the test mode of the current generating circuit, and
   wherein the current generating circuit is operated in the normal mode between the first and second time interval.

8. The electronic circuit as claimed in claim 1, wherein the voltage monitoring circuit comprises a first storage device to store a value of the first voltage and a second storage device to store a value of the second voltage, and wherein the voltage monitoring circuit comprises a calculating circuit to calculate the difference between the stored values of the first and second voltage by subtracting the respective values of the first and the second voltage from each other.

9. The electronic circuit as claimed in claim 1, wherein the voltage monitoring circuit comprises a voltage metering circuit to determine the first and second voltage, and wherein the voltage monitoring circuit comprises a controllable switch coupled to an output side of the voltage metering circuit to selectively couple the output side of the voltage metering circuit to the first and second storage device.

10. The electronic circuit as claimed in one of claims 4 to 9, wherein the current generating circuit reduces or shuts down the operating current, when the voltage monitoring circuit detects that the difference of the respective values of the first and second voltage exceeds a threshold value.

11. The electronic circuit as claimed in claim 1, wherein the voltage monitoring circuit is arranged to determine a forward voltage of the light emitting diode.

12. A method to monitor a temperature of a light emitting diode, comprising:

generating a first current and driving the first current through the light emitting diode;

determining a value of a first voltage of the light emitting diode, when driving the first current through the light emitting diode;

generating a second current being different from the first current and driving the second current through the light emitting diode, the first current and the second current respectively having a level which is lower than an operating current to operate the light emitting diode to emit light;

determining a value of a second voltage of the light emitting diode, when driving the second current through the light emitting diode; and monitoring the temperature of the light emitting diode by determining a difference of the respective values of the first and second voltage of the light emitting diode.

13. The method as claimed in claim 12, further comprising:

comparing the determined difference between the respective values of the first and second voltage with a threshold value; and reducing the operating current or shutting down the operating current to stop emitting light by the light emitting diode.

* * * * *